US007269689B2

(12) United States Patent
Eshghi et al.

(10) Patent No.: US 7,269,689 B2
(45) Date of Patent: Sep. 11, 2007

(54) SYSTEM AND METHOD FOR SHARING STORAGE RESOURCES BETWEEN MULTIPLE FILES

(75) Inventors: Kave Eshghi, Los Altos, CA (US); Hsiu-Khuern Tang, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 464 days.

(21) Appl. No.: 10/870,783

(22) Filed: Jun. 17, 2004

(65) Prior Publication Data

US 2005/0283500 A1 Dec. 22, 2005

(51) Int. Cl.
*G06F 12/00* (2006.01)
(52) U.S. Cl. ...................... 711/112; 382/124
(58) Field of Classification Search ................. 711/112
See application file for complete search history.

(56) References Cited

U.S. PATENT DOCUMENTS

| 5,990,810 | A | 11/1999 | Williams |
| 6,513,050 | B1 * | 1/2003 | Williams et al. ............ 707/202 |
| 6,961,009 | B2 * | 11/2005 | McCanne et al. ............. 341/51 |
| 2005/0091234 | A1 | 4/2005 | Hsu et al. |

OTHER PUBLICATIONS

Brin, Sergey, et al., "Copy Detection Mechanisms for Digital Documents", Department of Computer Science, Stanford University, Oct. 31, 1994, pp. 1-21.

Manber, UDI, "Finding Similar Files in a Large File System", Department of Computer Science, University of Arizona, TR 93-33, Oct. 1993, 11 pp.

Muthitacharoen, Athicha, et al., "A Low-Bandwidth Network File System", Proceedings of the 18th ACM Symposium on Operating Systems Principles (SOSP '01), Oct. 2001.

Rabin, M.O., "Fingerprinting By Random Polynomials", Technical report, Center for Research in Computing Technology, Harvard University, 1981. Report TR-15-81.

Rabin, M; "Fingerprinting by Random Ploynomials".

Manber, U; "Finding simliar Files in a Large File System"; Oct. 1993.

* cited by examiner

*Primary Examiner*—Brian R. Peugh
*Assistant Examiner*—Hashem Farrokh

(57) ABSTRACT

An improved sliding window chunking apparatus and method comprising comparing a fingerprint value of each position in a data set to a second set of criteria, at least in instances when it doesn't satisfy a first set of criteria, and, if the value satisfies the second set of criteria, identifying the position as a potential breakpoint. Subsequently, if a fingerprint value that satisfies the first set of criteria is not found before a maximum chunk size is reached, the potential breakpoint can be designated as a breakpoint. Further improvement is possible by imposing minimum and maximum sizes on chunks. In some instances, more than two sets of criteria may be used to identify additional potential chunks to be used should subsets having fingerprint values satisfying either of the first two sets of criteria not be found.

18 Claims, 3 Drawing Sheets

```
int position, lastBreak;
for    (position=0, lastBreak=0;! endOfFile(input); position++){
       //slide the window by one and update the fingerprint
       unsigned char c=getNextByte(input);
       unsigned int hash=updateHash(c);
       if (position - lastBreak<Tmin){
              //not a minimum size yet
              continue;
       }
       if ((hash % Ddash)==Ddash-1){
              //test to see if there is a hash match with Ddash
              //remember this backup break position, in case
              //we reach the maximum without finding a main breakpoint
              backupBreak=position;
       }
       if ((hash % D) == D-1){
              //test to see if there is a hash match with D
              //we found a breakpoint before the maximum threshold.
              addBreakpoint(position);
              backupBreak=0;
              lastBreak=position;
              continue;
       }
       if (position-lastBreak<Tmax){
              //we have failed to find a breakpoint, but we are not
              //at the maximum threshold yet.  Skip to the next character
              continue;
       }
       //when we reach here, we have not found a breakpoint with
       //the main divisor, and we are at the threshold.  If there
       //is a backup breakpoint, we use it.  Otherwise impose a
       //hard threshold here.
       if (backupBreak!=0){
              //there is a backup breakpoint.
              addBreakpoint(backupBreak);
              lastBreak=backupBreak;
              backupBreak=0;
       }
       else{
              //There is no hash main or backup breakpoint.  Impose a break.
              addBreakpoint(position);
              lastBreak=position;
              backupBreak=0;
       }
}
```

Fig. 2

SYSTEM AND METHOD FOR SHARING STORAGE RESOURCES BETWEEN MULTIPLE FILES

FIELD OF THE DISCLOSURE

The disclosure relates generally to sharing and otherwise optimizing the usage of storage and communication resources, more particularly to a system and method for sharing and otherwise optimizing the usage of storage and communication resources when multiple files of similar nature are concerned.

BACKGROUND OF THE INVENTION

As companies and individuals are increasingly using and relying on their computer systems and networks, the need for more efficient systems and faster networks is becoming more important. As a result, computer systems now have larger memories for storing information (e.g., data files and application programs) and computer networks have greater bandwidths for transmitting information. As the amount of information to be stored and transmitted continues to increase, the efficiency and speed of the computer systems and networks can be further improved by more efficiently and rapidly storing, retrieving and transmitting the information. Various systems and methods have been developed to carry out the efficient and rapid processing of the information. These systems and methods may utilize stateless chunking algorithms to achieve improved efficiency and speed.

Chunking algorithms break a long byte sequence S into a sequence of smaller sized blocks or chunks $c_1, c_2, \ldots, c_n$. This is preferably done in such a manner that the chunk sequence is stable under local modification of S. Stability under local modification means that if we make a small modification to S, resulting in S', and apply the chunking algorithm to S', most of the chunks created for S' are identical to the chunks for S. The term "stateless" in the name of the algorithm implies that to perform its task, the algorithm relies only on the byte sequence S as input and is not allowed to look at other transient or state dependent information that might be available. With unstable chunking algorithms, even minor insertions or deletions in the middle of a sequence will shift all the chunk boundaries following the modification point. Shifting chunk boundaries tends to result in different hash values, and, as a result, will typically result in the storage and/or transmittal of a large amount of unchanged data simply because it follows an insertion or deletion.

Chunking overhead is a measure of the amount of data that needs to be communicated and stored over and above the data that is actually contained in a modified sub-sequence. Reducing chunking overhead increases the efficiency of the apparatus that is using the chunking algorithm with regard to the apparatus's usage of communication and storage resources.

The need for chunking algorithms that are stable under local modification arises in at least two contexts: (1) archival file systems; and (2) low bandwidth network file systems. Unfortunately, previously known chunking methods and apparatus comprising such methods leave much to be desired both in regard to stability and efficiency. As such, the present disclosure is directed to methods and apparatus that can provide additional stability and/or efficiency, particularly when embodied in archival and low bandwidth network file systems.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein:

FIG. 2 is a code snippet illustrating a second method in accordance with embodiments of the present invention.

DETAILED DESCRIPTION

Figure 1:
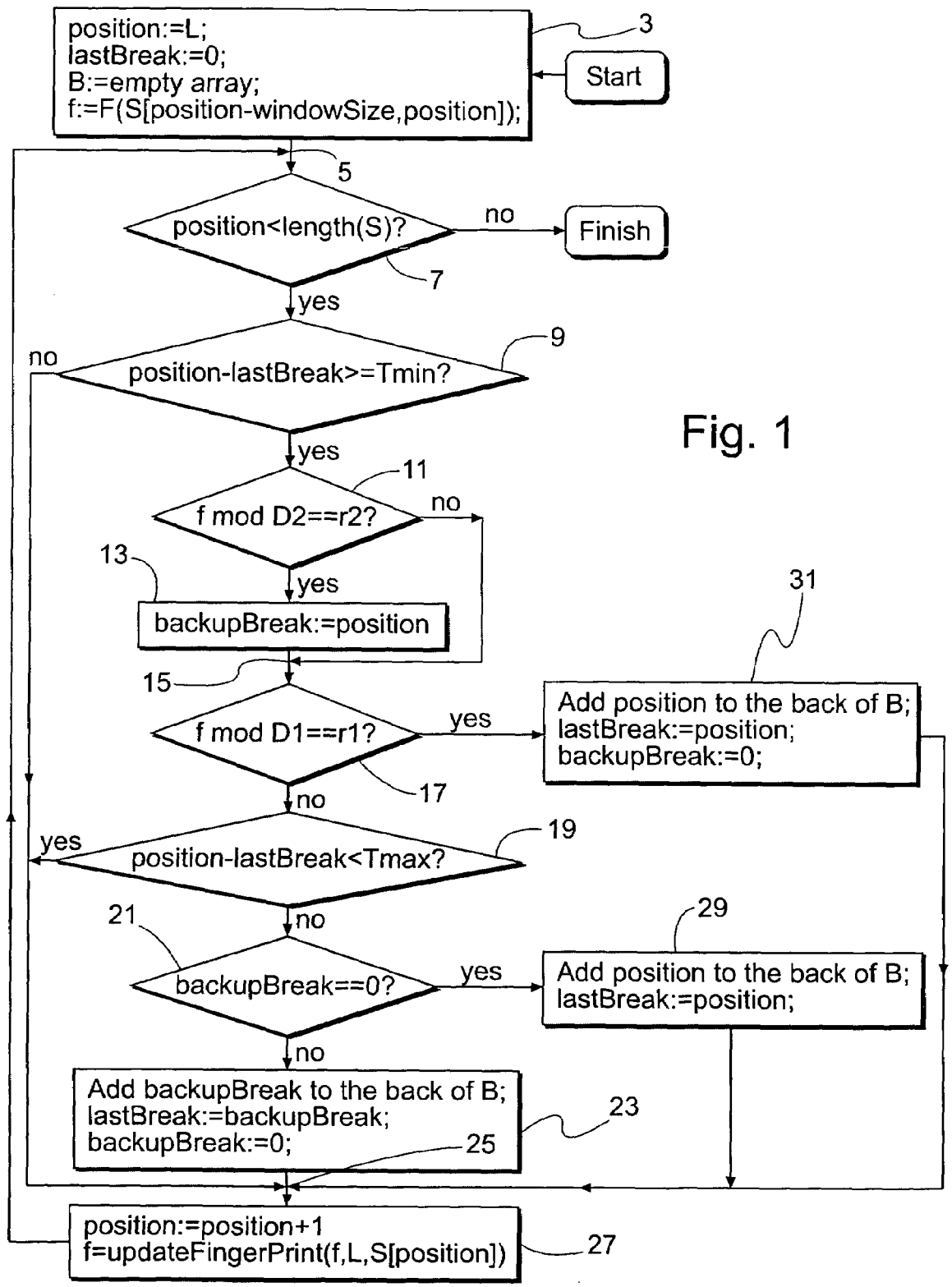
FIG. 1 is a flow chart illustrating a method in accordance with embodiments of the present invention.

Reference will now be made to exemplary embodiments of the invention, examples of which are illustrated in the accompanying drawings. While the invention will be described in conjunction with one or more embodiments, it will be understood that these embodiments are not intended to limit the invention. On the contrary, the invention is intended to cover alternatives, modifications and equivalents, which may be included within the spirit and scope of the invention as defined by the appended claims. In the following detailed description, numerous specific details are set forth in order to provide a thorough understanding of the present invention. However, it will be understood by one of ordinary skill in the art that the present invention may be practiced without these specific details. In other instances, well known methods, procedures, and components have not been described in detail so as not to unnecessarily obscure the important aspects of the present invention.

To provide a more stable division of a sequence such as a file into chunks (i.e. one where fewer chunks change for a given insertion or deletion), chunk boundaries can be made to depend on the local contents of a file rather than distance from the beginning of the file. One method of doing so is to use a sliding window algorithm where, for each position within a file, a fingerprint is computed for the sequence of data that falls within a window ending at the position, and, if the fingerprint satisfies a particular criteria, the position is designated as the end of a chunk (i.e. a breakpoint). As an example, if a file contains 1000 character positions, and a window size of 50 is used, the fingerprint of position 1000 is the fingerprint of the sequence beginning at position 951 and ending at 1000, the fingerprint of position 999 is the fingerprint of the sequence beginning at position 950 and ending at 999, the fingerprint of position 998 is the fingerprint of the sequence beginning at position 949 and ending at 998, and the fingerprint of other positions are determined in a similar fashion. When determined, the fingerprint of each position is divided by a pre-determined integer D and the remainder compared to a pre-determined value r. If the remainder equals r, the position is used as a breakpoint. If, for a particular position the remainder equals r, there is a "fingerprint match" at that position.

A more formal definition of a "fingerprint match" is: Given a sequence $S=s_1, s_2, \ldots s_n$, a hash function h and a window length 1, there is a fingerprint match at a position k if, for some pre-determined $r<D$, $h(W) \bmod D=r$ where $W=s_{k-1+1}, s_{k-1+2}, \ldots, s_k$ is the subsequence of length 1 preceding the position k in S. A "sliding window chunking method" as used herein, is a chunking method that sets breakpoints at each position in a sequence at which there is a fingerprint match. In computing the fingerprint value for a position, a highly efficient fingerprint algorithm, such as "Rabin's" fingerprint algorithm may be used to improve the efficiency of the chunking method.

As should be apparent, an advantage of using a sliding window algorithm to determine chunk boundaries rather than using fixed sized chunks is that chunks other than from the one in which a modification occurs are not impacted by the change. Further improvements can be achieved by setting minimum and maximum values on chunk sizes and (a) deleting any breakpoints that are so close to a prior breakpoint so as to define a chunk less than the minimum size, and (b) to insert at least one breakpoint between any two breakpoints defining a chunk larger than the maximum size so as to define at least one maximum size chunk, and one chunk that is less than or equal to the maximum size.

Further information methods and apparatus such as those previously described can be found by referring to the following references, each of which is hereby incorporated by reference in its entirety: (1) Brin, J. Davis, and H. Garcia-Molina. Copy detection mechanisms for digital documents. Department of Computer Science Report, Stanford University, October 1994; (2) Udi Manber, Finding Similar Files in a Large File System, DEPARTMENT OF COMPUTER SCIENCE, University of Arizona TR 93-33 October 1993; (3) U.S. Pat. No. 5,990,810 Method for partitioning a block of data into subblocks and for storing and communicating such subblocks; (4) A. Muthitacharoen, B. Chen, and D. Mazieres. A low-bandwidth network file system. In Proceedings of the 18th ACM Symposium on OperatingSystems Principles (SOSP '01), pages 174-187, Chateau Lake Louise, Banff, Canada, October 20014); and (5) M. O. Rabin. Fingerprinting by Random Polynomials. Tech. Rep. TR-15-81, Center for Research in Computing Technology, Harvard Univ., Cambridge, Mass., 1981.

A better method of dividing a sequence into chunks, i.e. smaller sequences, comprises the following. One can start with the predefined procedures D1Match(F) and D2Match (F), and three pre-determined integers W, M1 and M2. D1Match is a deterministic procedure that, when applied to an integer F, returns 'true' or 'false'. One possible embodiment of D1Match is to calculate the remainder of dividing F by pre-determined integer D1 and returning true if the remainder is equal to a pre-determined integer R1, and false otherwise. D2Match is also a deterministic procedure that, when applied to the integers F returns 'true' or 'false'. One possible embodiment of D2Match is to calculate the remainder of dividing F by pre-determined integer D2 and returning true if the remainder is equal to a pre-determined integer R2, and false otherwise. W is a window size that determines the size of the subsequence to be fingerprinted for each position as is done for a sliding window chunking algorithm as previously described. Preferably, with F chosen at random, the probability of D2Match(F) returning true is higher than that of D1Match returning true. M1 and M2 are, respectively, maximum and minimum chunk sizes.

Letting $b_m$ be the $m^{th}$ breakpoint (or the start of the sequence if $b_{m+1}$ is to be the first breakpoint in the sequence), $b_{m+1}$ is determined by performing the following steps. If $b^m$+M2 is bigger than or equal to the position at the end of the sequence, we are finished. Otherwise, scanning of the sequence is begun at a position $b_m$+M2, and, at each position k, a fingerprint value f of the subsequence between positions k-W and k is computed. D1Match(f) is computed and if it returns true, we say there is a "D1-match" at k. D2Match(f) is also computed and if it returns true, we say there is a "D2-match" at k. Scanning continues until a D1-match is found, or until position $b_m$+M1 is reached, whichever occurs first. If a D1-match is found before reaching the threshold M1, then that position is designated as breakpoint $b_{m+1}$. If a D1-match is not found before reaching the threshold M1, but at least one D2-match was found, the position resulting in the latest D2-match is designated as breakpoint $b_{m+1}$. If no D1-match or D2-match is found, the position of $b_m$+M1 is designated as the breakpoint $b_{m+1}$.

These steps can then be repeated until the end of the sequence is reached or the end of the interval currently being divided is reached. It should be noted that the method may be advantageously applied to sequences of integers, but may also be applicable to other sequences as well. It should also be noted that the method contemplates determining whether the fingerprint value satisfies a first set of criteria, i.e. whether it is a D1-match, and a second set of criteria, i.e. whether it is a D2 match. The method could be modified to utilize different sets of criteria, using the same sets of criteria with different divisor and remainder values, and/or using additional sets of criteria to provide for additional backup breakpoints to be used if neither a D1-match or a D2-match occurs.

In the method described, obtaining a fingerprint value for the members of the sequence currently within the window is preferably done using Rabin's fingerprint algorithm. As this algorithm is well known in the art, it will not be described in detail herein. Alternatively, other hashing/fingerprint algorithms may be used.

A more detailed embodiment of the preferred chunking method is shown as method 1 in FIG. 1. The method is used to produce an array B of breakpoints dividing S into chunks. In FIG. 1, block 2, various initializations are performed and the position variable is set to the size of the fingerprint window W, the lastBreak variable is set equal to zero which indicates that no breakpoint has been found yet, the array of breakpoints B is set to be an empty array, and f is set equal to the fingerprint value of the segment of the sequence of integers S being divided that begins at the beginning of the window (position-windowSize) and ends at the end of the window (position). In decision box 7, a check is made to see if the end of the sequence has been reached yet, and if so, chunking of sequence S is complete. If not, chunking of sequence S continues. The check is made by determining whether the current value of "position" is less than the length of S. If so, the end of S has not yet been reached and processing continues to decision box 9.

In decision box 9, a check is made to determine whether designating the current position as a breakpoint would result in a chunk that is smaller than the minimum chunk size. If so, the window is moved and the fingerprint value updated as shown in box 27. If not, the fingerprint value is evaluated. The check is made by comparing the difference between position and lastBreak to the value $T_{min}$ (M2 in the prior example).

In decision box 11, the fingerprint value f is evaluated by comparing the remainder resulting from dividing f by D2 to r2. As with the initial discussion of the method, D2 is a backup divisor value and r2 is a backup remainder value. If the remainder is equal to r2, the current position is, in box 13, designated as the backup breakpoint position by setting backupBreak equal to position. If the remainder is not equal to r2, the method jumps to point 15 and bypasses box 13.

In decision box 17, the fingerprint value f is evaluated by comparing the remainder resulting from dividing f by D1 to r1. As with the initial discussion of the method, D1 is a main divisor value and r1 is a main remainder value. If the remainder is equal to r1, the current position is, in box 31, designated as a breakpoint by adding it to the back of array B, the last position of the last breakpoint is updated to the current position by setting lastBreak equal to position, and any backup breakpoint positions are thrown out by setting backupBreak to zero. Subsequently, the window is moved and the fingerprint value updated as shown in box 27. If the residue is not equal to r1, the method continues with decision box 19.

In decision box 19, a check is made to determine whether setting a breakpoint at the current position would result in a chunk equal to the maximum chunk size. If not, then the window is moved and the fingerprint value updated as shown in FIG. 27. If so, then either a backup breakpoint or the current position will be designated as a breakpoint to prevent the chunk size from being greater than the maximum allowed size with the method progressing to decision box 21. The check of box 19 is performed by comparing the different between position and lastBreak to $T_{max}$, the maximum chunk size (M1 in the prior example).

Box 21 is reached if sliding the window would potentially result in a chunk size exceeding the maximum chunk size. In box 21, a check is made (by compare backupBreak to zero) to determine if a backup breakpoint was found. If so, the that backup breakpoint is (as shown in box 23) designated as a breakpoint by adding it to the back of array B, the last breakpoint position is set to that backup breakpoint position by setting lastBreak equal to backupBreak, and the backup breakpoint position is cleared by setting backupBreak to zero. Subsequently, the window is moved and the fingerprint value updated as shown in box 27.

If in box 21 the check determines that a backup breakpoint was not found, the current position is designated as a breakpoint as shown in box 29 to create a maximum sized chunk. This is done by adding the current position to the back of array B and setting lastBreak equal to position. Subsequently, the window is moved and the fingerprint value updated as shown in box 27.

In box 21, the current position is changed to be the next position in the sequence being divided, and the fingerprint value f is updated.

In FIG. 2, a pseudo C code snippet provides another embodiment of the present invention. It should be noted that the code of FIG. 2 is complete enough to serve as an example, but is not necessarily suitable for compilation in its current form. In FIG. 2, a number of variables correspond to those described in relation to FIG. 1. Exceptions are the use of "D" and "Ddash" in place of "D1" and "D2", "D-1" in place of "r1", and "Ddash-1" in place of "r2", and "hash" in place of "f". It also includes the function "addBreakpoint" to illustrate the step of adding a breakpoint to the array of breakpoints.

Some embodiments of the present invention, in addition to the methods previously described, also encompasses at least sequences chunked using such methods, apparatus storing and/or executing such methods, and apparatus storing and/or transmitting sequences chunked using such methods.

As such, a CD, DVD, or other storage device may be used to store a set of instructions implementing one or more of the methods described herein, and/or may be used to store a list chunked using one or more of the methods described herein. Contemplated storage apparatus include, but are not necessarily limited to, volatile solid state memory, non-volatile solid state memory; an optical disk, a magnetic disk, a magneto-optical disk, RAM, PROM, EPROM, magnetic tape, one or more electronic circuits, and/or a RAID, DAS, NAS, or SAN apparatus. In some instances the storage apparatus may be included in a larger system while in others it stands alone.

Figure 3:
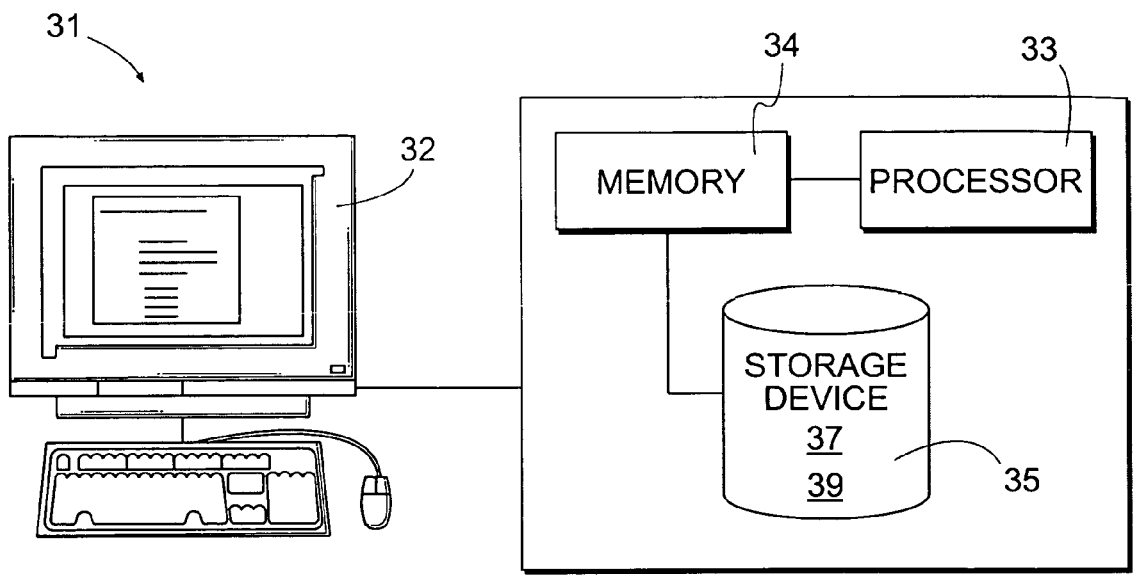
FIG. 3 is a schematic of a first apparatus in accordance with embodiments of the present invention.
Figure 4:
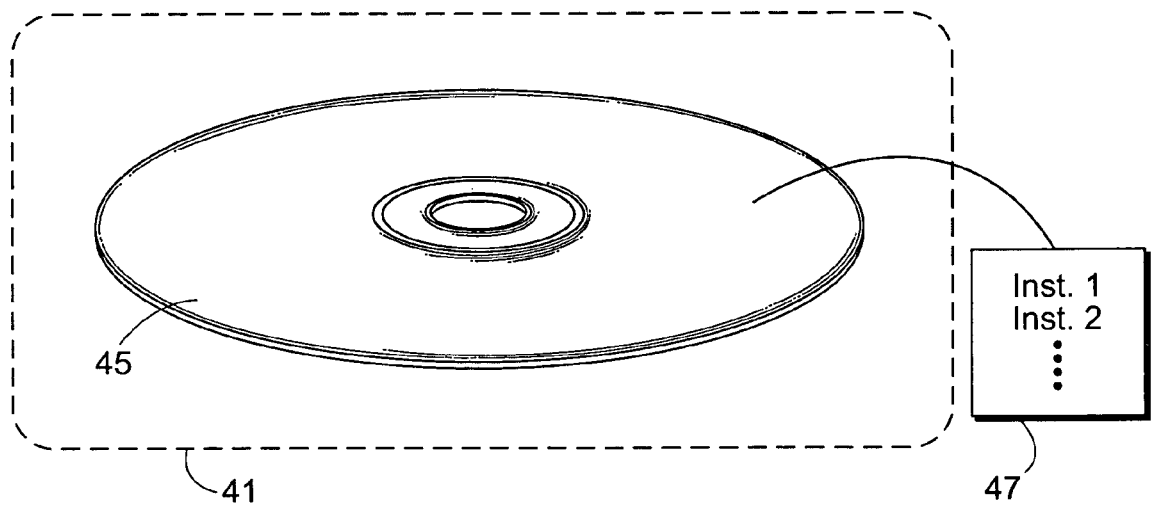
FIG. 4 is a schematic of a second apparatus in accordance with embodiments of the present invention.

As an example, in FIG. 3, an apparatus 31 is a computer 32 comprising a processor 33, memory 34, and machine readable medium 35 containing a sequence of values to be divided 37 and a set 39 of instructions which, when executed by the processor, cause the processor to perform operations for dividing the sequence of values 37 into a plurality of chunks in the previously described manner. FIG. 4 provides another example in which an apparatus 41 comprises a machine readable medium 45 which is a DVD disk containing a set of instructions 47 which, when executed by a machine, cause the machine to perform operations for dividing a sequence of values into a plurality of chunks as previously described.

If an apparatus embodying the invention comprises a set of instructions implementing one or more of the methods described herein, the set of instructions may have any reasonable form. As such the set may at least be stored as text in the syntax of a computer programming language similar to the form shown in FIG. 2, may be stored as object code in a compiled but unlinked format, may be stored in an executable format, may be encrypted and/or may be compressed. If stored in "text" form, it may be as, among others, a C, C++, C#, PASCAL, BASIC, COBOL, FORTRAN, RPG, LISP, JAVA, HTML, XML, SQL, Perl, ADA, Beta, Cecil, Eiffel, Elf, Erlang, Forth, Gentle, Haskell, Hope, lambda, Lygon, Mercury, Modula, Napier, Nestl, Obliq, Occam, Oz, Pict, Pilot, Pizza, Promethius, Python, Saser, Scheme, Sisl, Theta, Postscript, or assembly language "program" or set of programs. Moreover, the instruction set may be incorporated into a library or may be stored in one or more separate files.

If an apparatus embodying the invention comprises a sequence chunked using one or more of the methods described herein, the chunked sequence may have any reasonable form. As such, in some instances the breakpoints generated can be made an integral part of the sequence, in others they can be stored separately, possibly as an array, list, and/or sequence. In some instances breakpoints may not be expressly generated, but some other mechanism used to divide the sequence such as by storing the chunks themselves in an array, list, or in some other form.

If the apparatus is adapted to store the sequence, it may be adapted to compare the hash values of the chunked sequence with the hash values of previously stored chunks to determine which, if any of the chunks is to be stored. If the apparatus is adapted to transmit the divided sequence, it may do so by first transmitting hash values for the chunks to a receiving apparatus, and only transmitting chunks not already stored on the receiving apparatus. The determination of whether particular chunks are on the receiving apparatus may be done either by the sending or the receiving system. If done by the receiving system, transmission of a sequence my comprise transmitting the hash values of the sequence and then responding to requests from the receiving system for chunk that it doesn't already have.

If part of an apparatus, the apparatus may comprise the minimum elements to store, execute, and/or transmit the instruction set and/or the chunked sequence. It is contemplated that in many embodiments the apparatus will be a computer running a DOS, CPM, UNIX, WINDOWS, PalmOS, or Macintosh family operating system. In other embodiments other operating systems may be used, and/or a special-purpose operating system/application may be used such as one specialized for mainframes, robotics, manufacturing, and/or as a real-time control system.

In some instances the apparatus may be a manufactured product so as to provide a copy of the set of instructions or a copy of a chunked list to a buyer. In some instances the product will be a file or set of files that can be electronically transferred to a receiving apparatus while in others it may be a CD or DVD disk as previously discussed.

It is important to note that the methods of FIGS. 1 and 2 are only exemplary embodiments. As such, alternative embodiments may include additional or fewer steps, and/or may perform steps in a similar or different order. As an example, in some embodiments evaluating the fingerprint value to determine whether a D2-match has occurred may only be done if a prior evaluation shows that a D1-match has not occurred. As another example, although the methods described scan from the beginning of a sequence (or sub-sequence) to the end, alternative methods may scan from the end to the beginning, or may find breakpoints in some other fashion. Similarly, the actual assigning of breakpoints may be done in the order they appear in a sequence, may be done based on type (i.e. D1-matches first, then D2-matches, etc.), or may be one in some other manner.

As used herein, the term "obtaining" is used broadly and includes at least, receiving the object obtained from an internal or external source, performing steps that produce the object, and/or if a value, performing calculations that produce the value and/or computing the value. The term "adapted to" is also used broadly to indicate that the adapted object has at least one characteristic that facilitates its performing the identified function. Some example adaptations are appropriately sizing and dimensioning an object, programming an object, and providing an object with appropriate circuits, sensors, and actuators.

The methods and apparatus described herein are suitable for use in archival file systems that are used to store data blocks and that utilize a hash for each data block as a block identifier. To use a hash based storage scheme for storing files, each file is broken into a number of blocks using the chunking algorithms described herein, and the blocks are stored separately.

The methods and apparatus described herein are suitable for use in implementing low-bandwidth network file systems to minimize the amount of information transferred between a server and a client if the receiver (the server or the client) already has a similar version of the information (e.g., file) to be transmitted. For example, the server may have an earlier version of a file that the client wants to save on the server. The new file could have been created by retrieving and editing an existing file. Upon receipt of the existing file, the server breaks the existing file into chunks using a chunking algorithm as described herein, and creates a hash or identifier for each chunk. The server maintains a table or listing of the hashes for all the chunks stored in its memory with a pointer to where the chunk itself is stored. Now, if the client wants to save a newer version of the file on the server, the client breaks the new file into chunks using the same chunking algorithm, creates a hash for each chunk and sends the hashes to the server. The server looks up the hashes in its table and sends to the client a request for the chunks whose hashes are not found in the table. The client then sends those missing chunks to the server. Due to the stability property of the chunking algorithm, the server may have most of the chunks belonging to the client's file. The server reconstructs the files using the chunks without any ambiguity or error. A similar method is used to transmit files from the server to the client.

The embodiments of the present invention described herein comprise multiple novel features with each described embodiment including either a single such feature or a combination of such features. Other contemplated embodiments include all combinations of one or more such novel features not explicitly described herein as such combinations are readily discernable from the embodiments described. In light of the various contemplated embodiments, the present invention can be characterized in a number of ways with the following paragraphs providing examples of some such characterizations.

One useful embodiment of the present invention is as a method for dividing a sequence of values into a plurality of chunks where each chunk is a smaller sequence of values comprising: obtaining a fingerprint value for a position in the sequence; determining whether the fingerprint value is a D1-match and, at least if it is not, determining whether the fingerprint value is a D2-match; wherein a value is D1 match if the value divided by a first divisor D1 results in a remainder having a value R1; a value is a D2 match if the value divided by a second divisor D2 results in a remainder having a value R2; D1 is not equal to D2; and D1, D2, R1, and R2 have pre-determined values.

In some instances, useful embodiments may comprise obtaining a fingerprint value for a position in the sequence by obtaining a hash value for a sequence of data values contained in a window containing the position for which the fingerprint value is to be obtained. In some such instances embodiments may further comprise dividing the sequence of values by designating positions within the sequence as breakpoints where each breakpoint is the beginning or end of a chunk and a position is designated as a breakpoint if at least one of the following breakpoint conditions is true: the fingerprint value at that position is a D1-match; the fingerprint value at that position is a D2-match, and the distance between the prior breakpoint, if any, and any subsequent D1-match break point is greater than a pre-determined maximum value M1; and the distance between the prior breakpoint, if any, and the current position is equal to the maximum value M1. In some such instances embodiments might not designate a position as a breakpoint even if a breakpoint condition is true if the distance between the position and any prior breakpoint is less than a pre-determined minimum value M2. In some instances, useful embodiments may comprise dividing a sequence of values into a plurality of chunks wherein the last position of each chunk is a breakpoint and/or the last position in the sequence being divided. In some instances, useful embodiments may comprise dividing a sequence of values into a plurality of chunks wherein the first position of each chunk is a breakpoint and/or the first position in the sequence being divided.

In some instances, useful embodiments may comprise designating breakpoints in the sequence in which they occur by determining fingerprint values beginning at or near one end of the sequence of values and progressing through to the other end of the sequence of values. In some instances the sequence of values is a sequence of integer values and D1, D2, R1, and R2 are integers, that D1 is even, and D2 is one half of D1, or D1 is odd, and D2 is the next integer larger or smaller than D1 divided by two.

In some instances, methods may be performed by a computer, and/or may also comprise determining, at least if the fingerprint value is not a D1 match or a D2 match, whether the fingerprint value divided by at least one additional divisor DN results in a remainder having a value RN where DN and RN have predetermined values, DN is not equal to D1 or D2, and RN corresponds to DN.

In some instances, useful embodiments may include apparatus comprising a plurality of instructions for dividing a sequence of values into a plurality of chunks where each chunk is a smaller sequence of values comprising: obtaining a fingerprint value for a position in the sequence; determining whether the fingerprint value is a D1-match and, at least if it is not, determining whether the fingerprint value is a D2-match; wherein a value is D1 match if the value divided by a first divisor D1 results in a remainder having a value R1; a value is a D2 match if the value divided by a second divisor D2 results in a remainder having a value R2; D1 is not equal to D2; and D1, D2, R1, and R2 have pre-determined values. In some such instances, embodiments may include instructions that also divide the sequence into a plurality of adjacent, non-overlapping chunks wherein each chunk begins or ends on a position that satisfies at least one of the following breakpoint conditions: the fingerprint value at that position is a D1-match; the fingerprint value at that position is a D2-match, and the distance between the prior breakpoint, if any, and any subsequent D1-match break point is greater than a pre-determined maximum value M1; and the distance between the prior breakpoint, if any, and the current position is equal to the maximum value M1. In some instances embodiments may be adapted to electronically transfer the set of instructions to another apparatus. In some instances embodiments may comprise at least one of the following: volatile solid state memory, non-volatile solid state memory; an optical disk, a magnetic disk, a magneto-optical disk, RAM, PROM, EPROM, magnetic tape, an electronic circuit, and/or is a RAID, DAS, NAS, or SAN apparatus. In some instances the apparatus may be a computer.

In some instances, useful embodiments may include apparatus comprising a sequence of values divided into a plurality chunks wherein each chunk begins or ends on a position that satisfies at least one of the following breakpoint conditions: the fingerprint value at that position is a D1-match; the fingerprint value at that position is a D2-match, and the distance between the prior breakpoint, if any, and any subsequent D1-match break point is greater than a pre-determined maximum value M1; and the distance between the prior breakpoint, if any, and the current position is equal to the maximum value M1; wherein a value is D1 match if the value divided by a first divisor D1 results in a remainder having a value R1; a value is a D2 match if the value divided by a second divisor D2 results in a remainder having a value R2; D1 is not equal to D2; and D1, D2, R1, and R2 have pre-determined values. In some such instances embodiments may have or be adapted to obtain a hash value for each chunk, and being adapted to compare the hash values with the hash values of previously stored chunks to determine which, if any of the chunks is to be stored. In some instances, embodiments may be adapted to transmit the divided sequence by first transmitting hash values for the chunks to a receiving apparatus, and only transmitting chunks not already stored on the receiving apparatus. In some such or other instances, embodiments may only transmit chunks requested by the receiving apparatus after the receiving apparatus receives hash values.

What is claimed is:

1. A processor-based method for creating one or more chunks in a machine readable medium from a sequence of values in the machine readable medium, each chunk representing a portion of the sequence of values between at least two breakpoints, the method comprising:
    obtaining a fingerprint value for a position in the sequence of values in the machine readable medium;
    designating positions within the sequence of values as breakpoints where each breakpoint is the beginning or end of a chunk in the machine readable medium and a position is designated as a breakpoint if at least one of the following breakpoint conditions is true:
    (a) the fingerprint value at the position is a D1-match
    (b) the fingerprint value at the position is a D2-match, and the distance between the prior breakpoint, if any, and any subsequent D1-match breakpoint is greater than a pre-determined maximum value M1;
    (c) the distance between the prior breakpoint, if any, and the position is equal to the maximum value M1, wherein
    a value is a D1-match if a function D1Match returns 'true' when applied to the fingerprint value;
    a value is a D2-match if a function D2Match returns 'true' when applied to the fingerprint value;
    D1Match and D2Match are Boolean functions mapping integers to Boolean values; and
    when applied to a random integer, a probability that D1Match returns 'true' is smaller than a probability that D2Match returns 'true'.

2. The method of claim 1 wherein obtaining a fingerprint value for a position in the sequence comprises obtaining a hash value for a sequence of data values contained in a window containing the position for which the fingerprint value is to be obtained.

3. The method of claim 2 wherein the position is not designated as a breakpoint even if at least one of the breakpoint conditions is true if the distance between the position and any prior breakpoint is less than a pre-determined minimum value M2.

4. The method of claim 3 wherein the last position of each chunk is a breakpoint or the last position in the sequence of values.

5. The method of claim 3 wherein the first position of each chunk is a breakpoint or the first position in the sequence of values.

6. The method of claim 3 further comprising designating breakpoints in the sequence of values by determining fingerprint values beginning at or near one end of the sequence of values and progressing through to the other end of the sequence of values.

7. The method of claim 6 wherein the sequence of values is a sequence of integer values and D1, D2, R1, and R2 are integers.

8. The method of claim 7 wherein D1 is even, and D2 is one half of D1, or D1 is odd, and D2 is the next integer larger or smaller than D1 divided by two.

9. The method of claim 1 wherein:
    the function D1Match returns 'true' if the value divided by a first divisor D1 results in a remainder having a value R1;
    the function D2Match returns 'true' if the value divided by a second divisor D2 results in a remainder having a value R2;
    D1 is not equal to D2; and
    D1, D2, R1, and R2 have pre-detennined values.

10. The method of claim 1 wherein the method is performed by a computer.

11. The method of claim 1 further comprising determining, if the fingerprint value is not a D1-match or D2-match, whether the fingerprint value divided by at least one additional divisor DN results in a remainder having a value RN where DN and RN have predetermined values, DN is not equal to D1 or D2, and RN corresponds to DN.

12. An apparatus comprising:
a machine readable medium containing instructions which, when executed by a machine, causes the machine to perform operations for creating a plurality of chunks in a machine readable medium from a sequence of values in the machine readable medium where each chunk is a smaller sequence of values between at least two breakpoints, the operations comprising:

obtaining a fingerprint value for a position in the sequence of values in the machine readable medium;

grouping the sequence into a plurality of adjacent, non-overlapping chunks in the machine readable medium wherein each chunk begins or ends on a breakpoint, the breakpoint satisfying at least one of the following conditions:

(a) the fingerprint value at the position is a D2-match, and the distance between the prior breakpoint, if any, and any subsequent D1-match breakpoint is greater than a pre-determined maximum value M1;

(b) the distance between the prior breakpoint if any, and the position is equal to the maximum value M1; wherein a value is a D1-match if a function D1Match returns 'true' when applied to the fingerprint value; p1 a value is a D2-match if a function D2Match returns 'true' when applied to the fingerprint value;

D1Match and D2Match are pre-determined Boolean functions mapping integers to Boolean values; and when applied to a random integer, the probability that D1 Match returns 'true' is smaller than the probability that D2Match returns 'true'.

13. The apparatus of claim 12 wherein the apparatus is adapted to electronically transfer the set of instructions to another apparatus.

14. The apparatus of claim 13 wherein the machine readable medium comprises at least one of the following: volatile solid state memory, non-volatile solid state memory; an optical disk, a magnetic disk, a magneto-optical disk, RAM, PROM, EPROM, magnetic tape, an electronic circuit, and/or is a RAID, DAS, NAS, or SAN apparatus.

15. The apparatus of claim 12 wherein the apparatus is adapted to electronically transfer a set of fingerprint values to another apparatus wherein each fingerprint value in the set corresponds to a chunk of a divided sequence.

16. An apparatus comprising:
a machine readable medium for storing a fingerprint value representing a position in a sequence of values, the a sequence of values organized into a plurality of chunks in the machine readable medium wherein each chunk begins or ends on a position in the machine readable medium that satisfies at least one of the following breakpoint conditions:

the fingerprint value at the position is a D1-match;

the fingerprint value at the position is a D2-match, and the distance between a prior breakpoint, if any, and any subsequent D1-match breakpoint is greater than a pre-determined maximum value M1; and the distance between the prior breakpoint, if any, and the position is equal to the maximum value M1; wherein a value is a D1-match if the value divided by a first divisor D1 results in a remainder having a value R1;

a value is a D2-match if the value divided by a second divisor D2 results in a remainder having a value R2;

D1 is not equal to D2; and

D1, D2, R1, and R2 have specific values.

17. The apparatus of claim 16 wherein the apparatus has or is adapted to obtain a hash value for each chunk, and is adapted to compare the hash values with the hash values of previously stored chunks to determine which, if any of the chunks is to be stored.

18. The apparatus of claim 16 wherein the apparatus is adapted to transmit the organized sequence by first transmitting hash values for the chunks to a receiving apparatus, and only transmitting chunks not already stored on the receiving apparatus.

* * * * *

UNITED STATES PATENT AND TRADEMARK OFFICE
CERTIFICATE OF CORRECTION

PATENT NO. : 7,269,689 B2
APPLICATION NO. : 10/870783
DATED : September 11, 2007
INVENTOR(S) : Kave Eshghi et al.

It is certified that error appears in the above-identified patent and that said Letters Patent is hereby corrected as shown below:

In column 3, line 63, delete "$b^{m+}M2$" and insert -- $b_{m+}M2$ --, therefor.

In column 10, line 10, in Claim 1, after "D1-match" insert -- ; --.

In column 10, line 62, in Claim 9, delete "pre-detennined" and insert -- pre-determined --, therefor.

In column 11, line 4, in Claim 12, delete ";" and insert -- : --, therefor.

In column 11, line 28, in Claim 12, after "value;" delete "p1".

In column 12, line 10, in Claim 16, after "the" delete "a".

Signed and Sealed this

Fourteenth Day of October, 2008

JON W. DUDAS
*Director of the United States Patent and Trademark Office*